R. D. O. JOHNSON.
PNEUMATIC CONCENTRATOR.
APPLICATION FILED JAN. 25, 1913.
1,139,186.
Patented May 11, 1915.
3 SHEETS—SHEET 3.
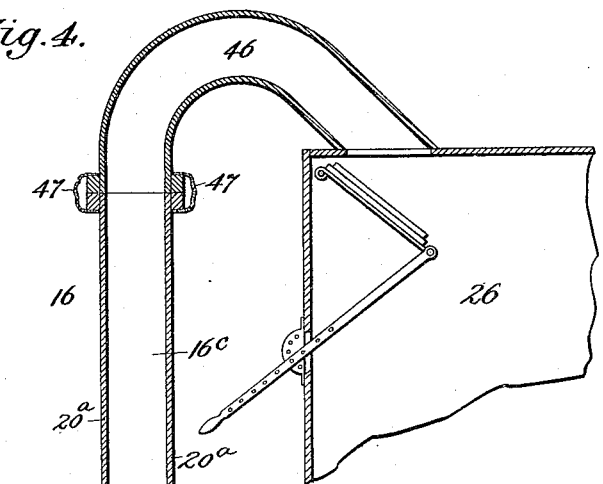
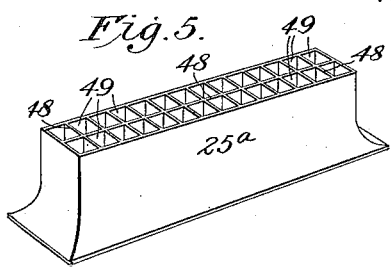
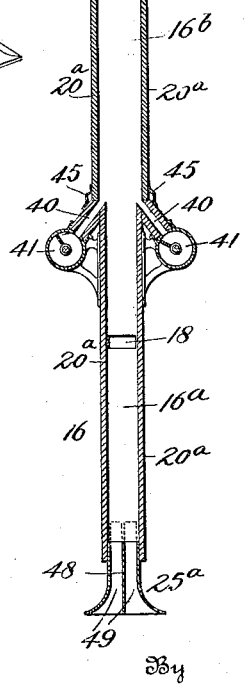

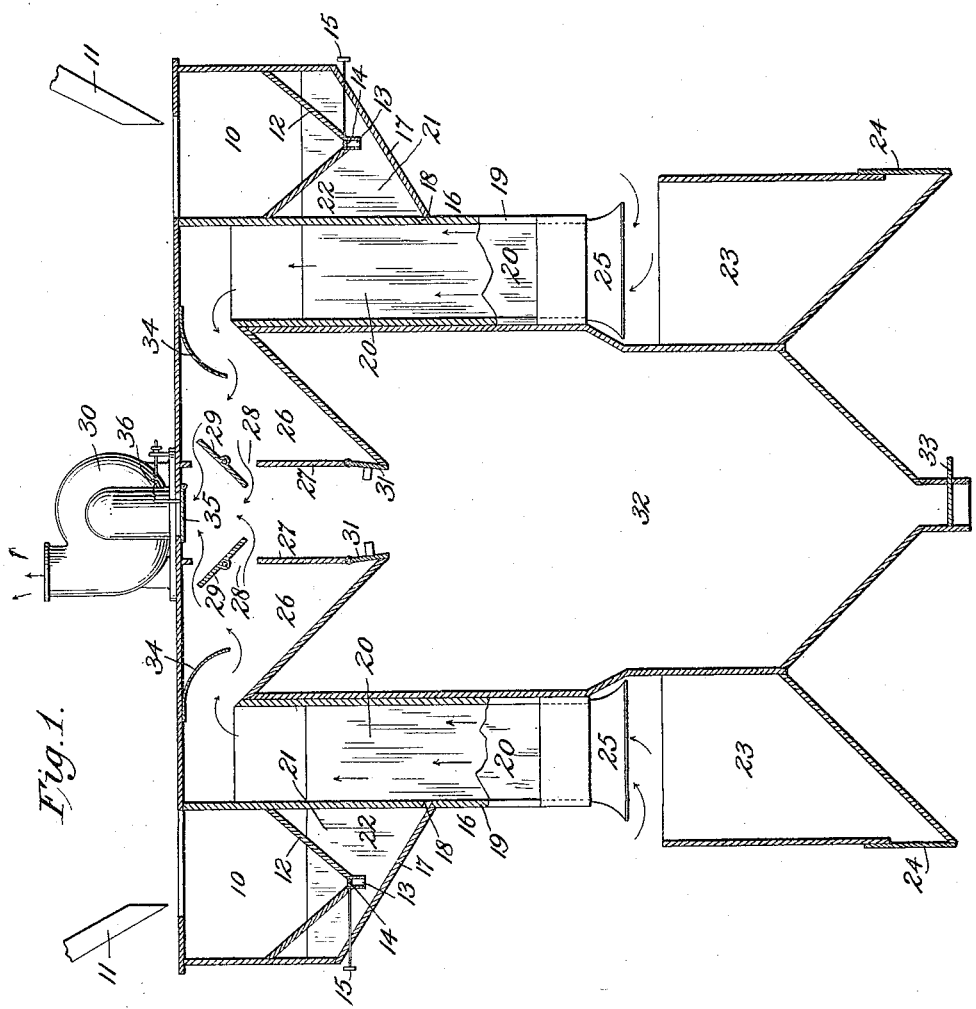

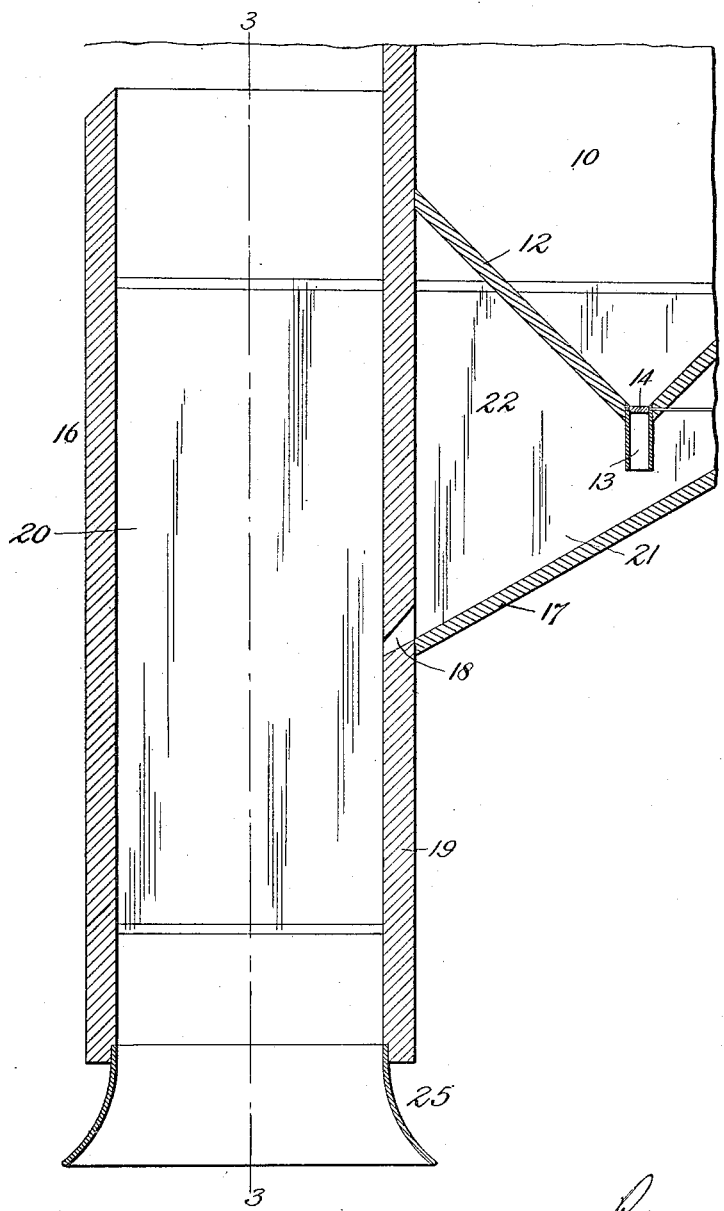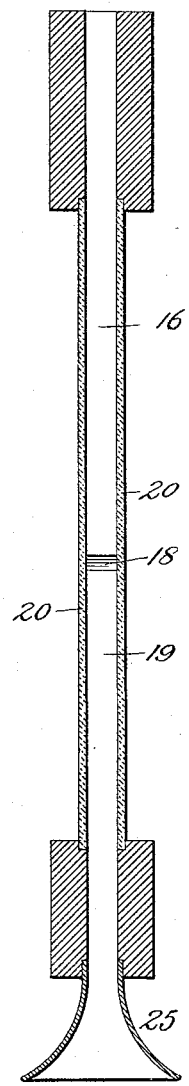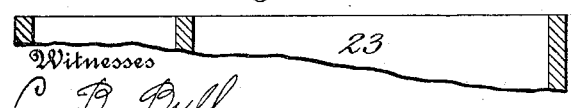

UNITED STATES PATENT OFFICE.

RENO D. O. JOHNSON, OF NAZARETH, PENNSYLVANIA, ASSIGNOR TO JOSEPH A. HORNER, OF BATH, PENNSYLVANIA.

PNEUMATIC CONCENTRATOR.

1,139,186.   Specification of Letters Patent.   Patented May 11, 1915.

Application filed January 25, 1913.   Serial No. 744,168.

*To all whom it may concern:*

Be it known that I, RENO D. O. JOHNSON, a citizen of the United States, residing at Nazareth, in the county of Northampton and State of Pennsylvania, have invented new and useful Improvements in Pneumatic Concentrators, of which the following is a specification.

This invention, generally considered, relates to a method of concentration and to concentrators designed to separate dry sized materials of different specific gravities, or a mixture of such, by passing the material or materials through a steady, regular current of air moving in a direction opposite to that taken by them, such current picking up and carrying off the lighter, valueless parts, but permitting the heavier parts to continue on their course so as to be collected in a suitable receptacle provided for the purpose. The air containing the lighter parts or tailings is carried through a settling chamber in which they separate by gravity from the air and fall into a receptacle, to be withdrawn therefrom as occasion demands.

The object of the invention—viewed as an apparatus—is to provide a simple structure for carrying out the above described operation in an economical manner, and comprises a vertical sorting or separating flue open at its lower end through which a current of air is drawn by a suction fan or pump. Through the shorter side of the flue about midway of its length, the material to be separated is admitted and allowed to fall by gravity against the ascending current of air. The specific gravity of the heavy valuable portions of the material is such that they are not held in suspension in the moving current of air, but continue falling and pass out of the flue to collect in a receptacle below. The light tailings are carried by the ascending current through the flue and out the same at the top into a chamber connected thereto, which chamber is provided with a valve for regulating the force of the air current. The air travels more slowly through this chamber, thus enabling the larger part of the tailings to settle therein, while the air passes through the valve, adjusted for the purpose, and out of the apparatus.

With this as the principal object in view, the apparatus consists of the novel construction, combination and arrangement of parts hereinafter described in detail and pointed out in the appended claims, reference being had to the accompanying drawings in which—

Figure 1 is a vertical section of a simple form of concentrating apparatus provided with two sorting or separating flues. Fig. 2 is a similar view, on enlarged scale, through one of the flues and the feed trough. Fig. 3 is a vertical transverse sectional view of the flue on the line 3—3 of Fig. 2. Fig. 4 is a vertical sectional view of a modified form of concentrating apparatus for separating a mixture of materials of different specific gravities. Fig. 5 is a perspective view of a modified form of air inlet nozzle or mouth for the separating flue.

In Figs. 1 to 3 of the drawings, 10 indicates a feed hopper into which the material to be separated is directed by a trough or chute 11. The hopper 10 has a converging bottom 12 which terminates in a narrow outlet spout 13 containing a gate 14, which may be opened to a greater or lesser extent by a handle or wheel 15 to regulate the feed of material to the sorting or separating flue 16. Below the spout 13 is an inclined guiding board 17 on which the material falls, and down which it runs to enter the separating flue 16 through a feed opening 18.

The sorting or separating flue 16 is in the form of a flat, thin, straight tube vertically placed with one of its narrow sides 19 coincident to the adjacent side of the feed hopper 10, against which side 19 the lower end of the guiding board 17 abuts, and through which the feed opening 18 is formed. The broad sides 20 of the flue 16 are preferably of glass through which the flow of material may be observed, whereby the feed of the material may be adjusted to the force of the air current. One side 21, or if desired both sides, of the feed hopper including the area of the closed casing 22 between the converging bottom 12 thereof and the guiding board 17, may be, and preferably are, formed of glass, so that the presence of material in the hopper and its rate of flow therefrom are at all times visible to the person in charge.

The lower end of the separating flue 16 is open and lies above a bin or receptacle 23 having an inclined bottom and a gate 24, which may be opened to permit the contents of the bin to run out. The lower end of the separating flue has an outwardly flaring mouth 25 spaced from the bin 23 to allow air to enter the flue. By flaring the mouth on easy curves there is no danger of cross currents within the flue, which are detrimental to the proper working of the apparatus.

On the side of the flue 16 opposite the feed hopper 10 is a settling chamber 26 connected with the open upper end of the flue. The bottom of this chamber inclines downwardly from the top of the flue to a vertical wall 27, at the top of which is an outlet port 28 guarded by a valve 29, which may be adjusted from without the apparatus to regulate the current of air through the flue generated by a suction fan 30. At the junction of the vertical wall 27 and the bottom of the settling chamber 26 is a swinging gate 31 held closed by a weight, which gate on being opened allows the contents of the settling chamber to fall into a bin 32, the latter being provided with an outlet spout and a sliding gate 33. Within the settling chamber 26 is a deflecting plate 34 which serves in part to direct the air from the flue to the bottom of the settling chamber, and prevent it passing in a direct line to the outlet port 28.

In one form of my apparatus, illustrated in Fig. 1, are shown a central bin or receptacle 32, with a separating flue 16 on each side thereof, and an independent feed hopper 10 and a settling chamber 26 for each flue. A single suction fan 30 will be sufficient, the ports 28 being placed near the inlet pipe of the fan as shown. If desired and the work demands, a large number of flues 16 may be placed side by side, without occupying a great amount of room owing to the narrowness of the flues, as particularly shown in Fig. 3.

The partial vacuum within the apparatus created by the fan 30 is constantly maintained by means of an inwardly opening valve 35 at the top, and which is held closed by a spring 36 which may be adjusted to suit the vacuum.

The operation of the apparatus as so far described and a further detailed statement of the construction and action of certain of its parts, may be stated as follows: The material to be separated runs down the chute 11 into the feed hopper 10. This material must be dry and sized, the variety of sizes which may be treated at one operation depending upon the differences in specific gravities of the component particles. The greater the difference in specific gravities the greater the permissible range in sizes. From the feed hopper 10 the material falls through the gate 14 onto the guiding board 17 and, sliding down this board and through the feed opening 18, passes into the flue 16. It is essential that this feed opening be remote from the mouth of the flue, and also that there shall be opposite said opening a wide space inasmuch as it is at this point that the disengaging of the particles from one another takes place. In other words, an extended frontage is needed at the point where the opening is situated. The flue 16 in horizontal section, as already stated, forms a flattened rectangular figure. as seen, for example, in Figs. 2 and 3, and it is essential that the opening 18 shall be placed at the narrow side or edge of the flue, so that the material shall be introduced in a direction as nearly horizontal as is possible consistent with the flow, and that the velocity of delivery shall be as little as is practicable. The material having entered the flue, the concentrating and separating action begins, that is to say, as soon as the particles are able to pass one another and become disengaged. In these more or less hindered movements the particles travel in a more or less horizontal direction, hence the necessity of providing a wide space in front of the feed opening 18. Therefore, as distinctive from the prior art as known to me, I place the opening along the short side or edge of a flue having sides comparatively much greater in length than the length of the edge at which the opening is placed, and without ample space in front of the feed opening the disengagement or disentanglement of the particles of different specific gravities is impossible, and concentration cannot be effected. By giving to the flue the flat, thin and straight construction described, and arranging the feed opening in the stated relation thereto, I am able to accomplish a high degree of concentration of the most difficult ores. The flue must be narrow to adapt it to a uniform vertical current, for in flues having sides approaching equality in length it is impossible to prevent such vertical movements of the air as interfere with the concentrating action by throwing the particles against the sides of the flue. The particles coming in contact with the sides of a flue of substantially equal dimensions, are checked in their normal movement, and accumulation of material along vertical lines against the sides is permitted. When this occurs the vertical current becomes overloaded at such points with the consequent plunging of a mass of unconcentrated material into the concentrates below. Such objections are obviated by my invention. The fan 30, exhausting the air from the apparatus, causes a current of air to pass in a more or less vertical direction through the flue. This current must be uniform in velocity and without cross or eddy currents. Therefore, the entrance for air to the flue is made with an outwardly deflected or curved mouth, by means of which the air is quietly directed into the flue, and eddy currents which tend to form in fluids when passing around sharp curves are prevented. The casing 22 below the feed hopper is sealed airtight, and a sufficient quantity of material is maintained in the feed hopper to prevent air from entering the flue through said hopper, as a draft of air passing through the feed opening 18 into the flue would interfere with the working of the machine by projecting the material across the flue.

The material enters the flue 16 about midway its length through the feed opening 18, which may be of the same width as the flue and, falling through the ascending current of air, the heavy valuable parts or concentrates continue to fall and enter the bin or receptacle 23. The lighter particles or tailings are carried by the current of air upwardly through the flue into the settling chamber 26, and striking the deflecting plate 34 are directed downwardly into the lower part of the chamber. Here the tailings separate from the air and fall to the bottom of the chamber, escaping through the weighted gate 31 into the bin 32. The air then passes to the top of the chamber 26 and is drawn through the port 28 to the fan. The strength of the current is regulated by means of the valve 29, the valve of each flue being independently controlled. The size of the feed opening 18 may be varied as to either dimension in accordance with requirements.

A modified form of the apparatus is represented in Fig. 4 which shows the separating flue made in several sections, three being here shown and numbered 16$^a$, 16$^b$, 16$^c$. These sections increase in cross sectional area from below upward, as shown, for the purpose of separating a mixture of materials of different specific gravities. Material entering the flue at 18 encounters the ascending air current as hereinbefore described, and all but the heavier particles are carried out of the section 16$^a$ into that 16$^b$ which, having a larger area, allows the air to travel therethrough with reduced velocity. The supporting capacity of the air is here lessened, so that material just heavy enough to be raised in the flue section 16$^a$ will be permitted to fall when it enters the section 16$^b$. In falling, the material is carried to the sides of the flue and enters the channels 40 at the junction between the sections 16$^a$ and 16$^b$, these channels leading off to screw or other conveyers 41 for delivering the material into a bin placed for the purpose. A further reduction of the velocity of the air takes place in passing from the section 16$^b$ to section 16$^c$, and particles that cannot be sustained in the lessened current fall into channels 42, similar to those 40, and pass thence to conveyers 43. The number of sections will depend upon the complexity of the ore treated or the number of minerals of different specific gravities to be separated.

The flue sections may be made with adjustable parts 20$^a$ flexibly connected thereto at 45 so that the cross sectional areas may be adjusted to the specific gravities of the materials being separated. Furthermore, said flexibly connected sections are joined to the delivery tube 46 o fthe settling chamber 26$^a$ by a flexible connection 47.

The air inlet nozzle or mouth 25 may be, and preferably is, sectionalized, as shown by 25$^a$, Figs. 4 and 5. As there shown, the nozzle or mouth is divided by longitudinal and transverse partitions 48 into a number of small channels 49, which prevent the formation of eddies and cross currents that would interfere with the concentration. These partitions, instead of terminating at the top of the nozzle 25$^a$, may extend a greater or lesser distance beyond that point, as indicated in dotted lines in Fig. 4, to prevent vortices. The word sectionalized here used with reference to the flared mouth is therefore intended to describe a formation in which a series of relatively elongated passages straight in the direction of the length of the flue beyond the flared mouth are employed. Such sectionalized nozzle at the intake end of the flue introduces the air in straight vertical parallel streams and tends to prevent cross or eddy currents, and is peculiarly adapted to a flue having the flat cross-sectional shape herein described.

My invention contemplates the employment of a practically continuously moving column of air or other liquid in a flue of the character described, that is to say, prolonged and extended in one direction relatively to its other dimensions, and in the line of trajectory or the direction of feed, whether the flue be used in connection with a flared mouth such as is shown more particularly in Figs. 1, 2 and 3, or with the sectionalized or subdivided mouth shown in Figs. 4 and 5, or with any mouth of ordinary type. Such construction of flue, and arrangement of the feed opening intermediate of the length of said flue, as herein described, are advantageously employed in the form of a series of flues of increasing sectional area and used with the described sectionalized intake or mouth, and in connection with a traveling conveyer whereby to carry the material to any selected destination. A flue of this character, especially when combined with a flared mouth having a series of comparatively small straight passages in the direction of the flue beyond the flaring portion, is of advantage in the general combination described and shown, in which means are provided for regulating the force of the current through the flue, and for feeding, settling, distributing and discharging the materials operated upon. In fact, the whole structure is thought to be composed of parts each designed to coöperate in the effecting of results in this art. This is true whether the structure shown in Figs. 1, 2 and 3, or one in conformity with the modification seen in Fig. 4 is used. Under either form of the invention substantially the same kind of flue is utilized, and in Fig. 4, wherein means for generating a current in a direction opposite to that induced by gravity are employed with a series of flue sections of progressively enlarging area, the common principle of operation herein described is found.

It is evident that my invention, though designed more specifically for the use of air, is applicable in some of its phases to the use of water or other liquid.

The dimensions of the sorting or separating tubes employed are to be regulated by calculation based upon the character of the material to be treated and other conditions.

Having thus described my invention, I claim:—

1. In an apparatus of the kind described, a vertically disposed separating flue of flattened rectangular shape provided in one of its narrow sides with an opening intermediate of its length and confronting an extended open space reaching to its opposite narrow side, combined with feed means in communication with said opening, and adapted to deliver material to be treated into the flue in the direction of the opposite narrow side, a settling chamber at the upper end of said flue, and means for generating a current of air in said flue in a direction opposed to that of the gravital movement of the material, substantially as set forth.

2. In an apparatus of the kind described, a vertically disposed separating flue of flattened rectangular shape provided in one of its narrow sides with an opening intermediate of its length and confronting an extended open space reaching to the opposite side of said flue, said extended open space being in the line of trajectory, combined with feed means in communication with said opening, and adapted to project material to be treated into the flue in the direction of the opposite narrow side, a settling chamber at the upper end of said flue, and means for generating a current of air in said flue in a direction opposed to that of the gravital movement of the material, substantially as set forth.

3. In an apparatus of the kind described, a vertically disposed separating flue prolonged or extended in the direction of the feed of material and relatively to the dimensions of said flue in other transverse directions, said flue having an opening intermediate of its length and confronting such prolongation or extension through which the material to be separated enters the flue to fall therethrough by gravity, means for generating a current of air in said flue in a direction opposed to that of the gravital movement of the material, a mouth on the lower end of the flue for the entrance of air and shaped to direct the air current in a straight line through the flue, a feed hopper delivering to the feed opening, a settling chamber connected to the upper end of the flue, and a receiving means below and spaced from the air inlet end of said flue.

4. In an apparatus of the kind described, a vertically disposed separating flue prolonged or extended in the direction of the feed of material and relatively to the dimensions of said flue in other transverse directions, said flue having an opening intermediate of its length and confronting such prolongation or extension through which the material to be separated enters the flue to fall therethrough by gravity, means for generating a current of air in said flue in a direction opposed to that of the gravital movement of the material, a mouth on the lower end of the flue having outwardly flaring sides of a shape to direct the air current in a straight line through the flue, a feed hopper delivering to the feed opening, a receiving means for the heavier particles below the mouth and spaced therefrom, a settling chamber connected to the upper end of the flue to receive the lighter particles, a deflector in the settling chamber, a gravity operated gate at the bottom thereof, and a receptacle below said separating chamber to receive the particles collected in the settling chamber.

5. In an apparatus of the kind described, a vertically disposed separating flue providing a horizontally narrow but extended interior space and having a feed opening confronting said extended space, the line of trajectory being conformable to the line of said extended space, feeding means communicating through said opening with the flue, and means for causing a fluid current in the flue in opposition to the gravital movement of the material, substantially as set forth.

6. In an apparatus of the kind described, a vertically disposed separating flue providing a narrow but extended interior space and having a feed opening confronting said extended space, the line of trajectory being conformable to the line of said extended space, combined with an air inlet mouth open to the atmosphere, said mouth being flared and subdivided into a series of relatively small elongated passages straight in the direction of the length of the flue beyond the flare, and means for causing a fluid current in the flue in opposition to the gravital movement of the material, substantially as set forth.

7. In an apparatus of the kind described, a vertically disposed separating flue providing a narrow but extended interior space and having a feed opening confronting said extended space, the line of trajectory being conformable to the line of said extended space, said flue being furnished with a flared mouth open to the atmosphere and subdivided into a series of relatively small elongated passages straight in the direction of the length of the flue beyond the flare, combined with means for generating a current of air in said flue in a direction opposed to that of the movement of the material, and with feeding and discharging means, substantially as specified.

8. In an apparatus of the kind described, a vertically disposed separating flue section prolonged or extended, as seen in cross section, in the direction of the feed of material and relatively to the dimensions of said flue in other transverse directions, and having an opening confronting such prolongation or extension, combined with a series of superposed flue sections of progressively increasing area in cross section, a flared mouth or intake at the lower end of the lower flue section, means for maintaining a current of air in said flue sections in a direction opposed to that of the gravital movement of the material, and collecting and discharging means adjacent to and communicating with said flue sections, substantially as set forth.

9. In an apparatus of the kind described, a vertically disposed separating flue section prolonged or extended, as seen in cross section, in the direction of the feed of material and relatively to the dimensions of said flue in other transverse directions, and having an opening confronting such prolongation or extension, combined with a series of superposed flue sections of progressively increasing area in cross section, an air inlet mouth open to the atmosphere and situated at the lower end of the lower flue section, said mouth being flared and subdivided into a series of relatively small elongated passages straight in the direction of the length of the flue section beyond the flare, means for maintaining a current of air in said flue sections in a direction opposed to that of the gravital movement of the material, and collecting and discharging means adjacent to and communicating with said flue sections, substantially as set forth.

10. In an apparatus of the kind described, a vertically disposed separating flue prolonged or extended, as seen in cross section, in the direction of the feed of material and relatively to the dimensions of said flue in other directions, and having an opening confronting such prolongation or extension, means for generating a current of air in said flue in a direction opposite to that of the gravitational movement of the material, an air inlet mouth at the lower end of said flue for directing the entering air into straight vertical lines, means for receiving material fed to said flue of such gravity as to overcome the force of said current, means for receiving material the gravity of which is such as to be overcome by said current, and means for regulating the strength of said current.

11. In an apparatus of the kind described, a vertically disposed separating flue providing a narrow but extended interior space and having a feed opening confronting said extended space, the line of trajectory being conformable to the line of said extended space, combined with an air inlet mouth open to the atmosphere, said mouth being flared and longitudinally subdivided, and means for causing a fluid current in the flue in opposition to the gravital movement of the material, substantially as set forth.

In testimony whereof I affix my signature in presence of two witnesses.

RENO D. O. JOHNSON.

Witnesses:
LESLIE C. WILLIAMS,
GEORGE A. HAGENBACH.

Copies of this patent may be obtained for five cents each, by addressing the "Commissioner of Patents, Washington, D. C."